US007950954B2

(12) United States Patent
Liu

(10) Patent No.: US 7,950,954 B2
(45) Date of Patent: May 31, 2011

(54) FASTENING MECHANISM AND PORTABLE ELECTRONIC DEVICE WITH FASTENING MECHANISM

(75) Inventor: Zhi-Gang Liu, Nanjing (CN)

(73) Assignees: Inventec Appliances (Shanghai) Co. Ltd., Shanghai (CN); Inventec Appliances Corp., Taipei County (TW); Inventec Appliances Corp., Nanjing, Nanjing (CN)

( * ) Notice: Subject to any disclaimer, the term of this patent is extended or adjusted under 35 U.S.C. 154(b) by 0 days.

(21) Appl. No.: 12/879,513

(22) Filed: Sep. 10, 2010

(65) Prior Publication Data
US 2011/0092082 A1    Apr. 21, 2011

(30) Foreign Application Priority Data
Oct. 19, 2009   (CN) ...................... 2009 2 0210939 U

(51) Int. Cl.
*H01R 3/00*     (2006.01)
(52) U.S. Cl. ........ 439/500; 439/341; 439/366; 439/754; 439/929
(58) Field of Classification Search .................. 439/341, 439/366, 500, 754, 929
See application file for complete search history.

(56) References Cited

U.S. PATENT DOCUMENTS

| 6,010,351 | A  | * | 1/2000  | Kuboto ......................... 439/347 |
| 6,116,937 | A  | * | 9/2000  | Pan ............................... 439/352 |
| 6,994,581 | B2 | * | 2/2006  | Sung ............................ 439/347 |
| 7,850,484 | B2 | * | 12/2010 | Hayashi et al. ............... 439/529 |

* cited by examiner

*Primary Examiner* — James Harvey
(74) *Attorney, Agent, or Firm* — WPAT, P.C.; Anthony King

(57) ABSTRACT

The present invention includes a fastening mechanism comprising a base and a metal frame. The base has an accommodating slot arranged for accommodating a memory card, a first fastener and a second fastener. The first fastener and the second fastener are electrically connected to a battery and the memory card, respectively. When the metal frame is in a fastening position and fastened to the first fastener and the second fastener, the memory card can be clamped between the base and the metal frame. Then an electrical path is formed among the first fastener, the second fastener and the metal frame, thereby supplying the memory card with power of the battery. The present invention further includes a portable electronic device with the above fastening mechanism in which the electrical path is opened, while removing the memory card, so as to prevent supplying the memory card with power of the battery.

15 Claims, 7 Drawing Sheets

FASTENING MECHANISM AND PORTABLE ELECTRONIC DEVICE WITH FASTENING MECHANISM

FIELD OF THE INVENTION

The present invention relates to a fastening mechanism; and more particularly, to a fastening mechanism for accommodating a memory card, and a portable electronic device with the fastening mechanism.

BACKGROUND OF THE INVENTION

With the development of technology, a variety of electronic devices are available in the modern life. Handheld devices, such as a cellular phone, are convenient to communicate anytime and anywhere, have become an indispensable part of daily life for people. Recently, in fashion trends of low profile for the cellular phones industries have dedicated their research and development to effort products with thinner to fulfill the customers' needs.

In general, for decreasing the thickness of the cellular phone, the arrangement that a battery being disposed on a memory card is usually avoided in the products. Instead, the memory card is disposed on the side of the battery, and components are avoided to be disposed under the battery, thereby effectively decreasing the thickness of the cellular phone. Compared with the arrangement that the battery being disposed on the memory card, users can insert or remove the memory card at any time without removing the battery through the aforementioned arrangement. However, if the users remove the memory card without disconnection power, short circuits which lead to lost of the stored data may be induced, and even the memory card may be damaged.

SUMMARY OF THE INVENTION

In view of the aforementioned drawbacks in the prior art, an object of the present invention is to provide a fastening mechanism comprising at least a base and a metal frame. The base has an accommodating slot for accommodating a memory card, and the base has a first fastener and a second fastener. The first fastener is used for electrically connecting to a battery, and the second fastener is used for electrically connecting to the memory card. The first fastener and the second fastener are disposed on two opposite sides of the accommodating slot, respectively. And the metal frame is fit to be connected to the base. When the memory card is accommodated and connected to the second fastener and the metal frame is fastened to the first fastener and the second fastener, the metal frame can be disposed in a fastening position relative to the base and lean against the memory card, thereby clamping the memory card between the base and the metal frame. And then an electrical path is formed among the first fastener, the second fastener and the metal frame to supply the memory card with the power of the battery connected to the first fastener.

According to an embodiment of the present invention, the metal frame is connected to the base by being movable between the fastening position and a disengaging position in which the metal frame is not fastened to the first fastener and the second fastener.

According to another embodiment of the present invention, when the metal frame is disposed in the disengaging position, the electrical path formed among the first fastener, the second fastener and the metal frame is opened to prevent supplying the memory card with the power of the battery.

According to another embodiment of the present invention, the base further has a plurality of resilient pins. When the metal frame is disposed in the fastening position, the metal frame is electrically connected to the memory card, and the plurality of resilient pins are disposed in the accommodating slot and electrically connected to the second fastener. When the metal frame is disposed in the disengaging position, the memory card and the metal frame are lifted by the plurality of resilient pins.

According to another embodiment of the present invention, the metal frame further comprises a third fastener and a fourth fastener arranged for fastening the first fastener and the second fastener, respectively.

According to another embodiment of the present invention, the metal frame further comprises a metal wire electrically connected with the third fastener and the fourth fastener. The metal wire has an intrinsic resistance less than or equal to 0.1 ohm.

Additionally, another aspect of the present invention provides a portable electronic device comprising at least a main board and a fastening mechanism. The main board is used for electrically connecting to a battery, and the fastening mechanism is arranged for fastening a memory card. The fastening mechanism comprises at least a base and a metal frame. The base is disposed on the main board and has an accommodating slot for accommodating the memory card. Also the base has a first fastener and a second fastener. The first fastener is used for electrically connecting to the battery through the main board, and the second fastener is used for electrically connecting to the memory card. The first fastener and the second fastener are disposed respectively on two opposite sides of the accommodating slot. And the metal frame is fit to be connected to the base. When the memory card is accommodated and connected to the second fastener and the metal frame is fastened to the first fastener and the second fastener, the metal frame can be disposed in a fastening position relative to the base and lean against the memory card, thereby clamping the memory card between the base and the metal frame. And then an electrical path is formed among the first fastener, the second fastener and the metal frame to supply the memory card with power of the battery connected to the first fastener.

According to an embodiment of the present invention, the metal frame is connected to the base by being movable between the fastening position and a disengaging position in which the metal frame is not fastened to the first fastener and the second fastener. When the metal frame is disposed in the disengaging position, the electrical path formed among the first fastener, the second fastener and the metal frame is opened to prevent supplying the memory card with the power of the battery.

According to another embodiment of the present invention, the base has a plurality of resilient pins. When the metal frame is disposed in the fastening position, the metal frame is electrically connected to the memory card, and the plurality of resilient pins are disposed in the accommodating slot and electrically connected to the second fastener. When the metal frame is disposed in the disengaging position, the memory card and the metal frame are lifted by the plurality of resilient pins.

According to another embodiment of the present invention, the portable electronic device further comprises a casing. The main board is disposed in the casing, and the casing has a battery slot and a memory card slot. The memory card slot is disposed next to the battery slot, and the battery slot is arranged for accommodating the battery. And the fastening mechanism is disposed in the memory card slot.

According to the embodiment of the fastening mechanism and the portable electronic device with the fastening mechanism, the fastening mechanism is arranged for fastening the memory card. The metal frame of the fastening mechanism is used as a disconnection production mechanism to ensure that the electrical path is opened while taking out the memory card to prevent the memory card from being damaged.

BRIEF DESCRIPTION OF THE DRAWINGS

The structure and the technical means adopted by the present invention to achieve the above object can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof with reference to the accompanying drawings. It is understood the experimental data shown in the embodiments are provided only for easy interpretation of the technical means of the present invention and should in no means be considered as restriction to the present invention.

Figure 1:
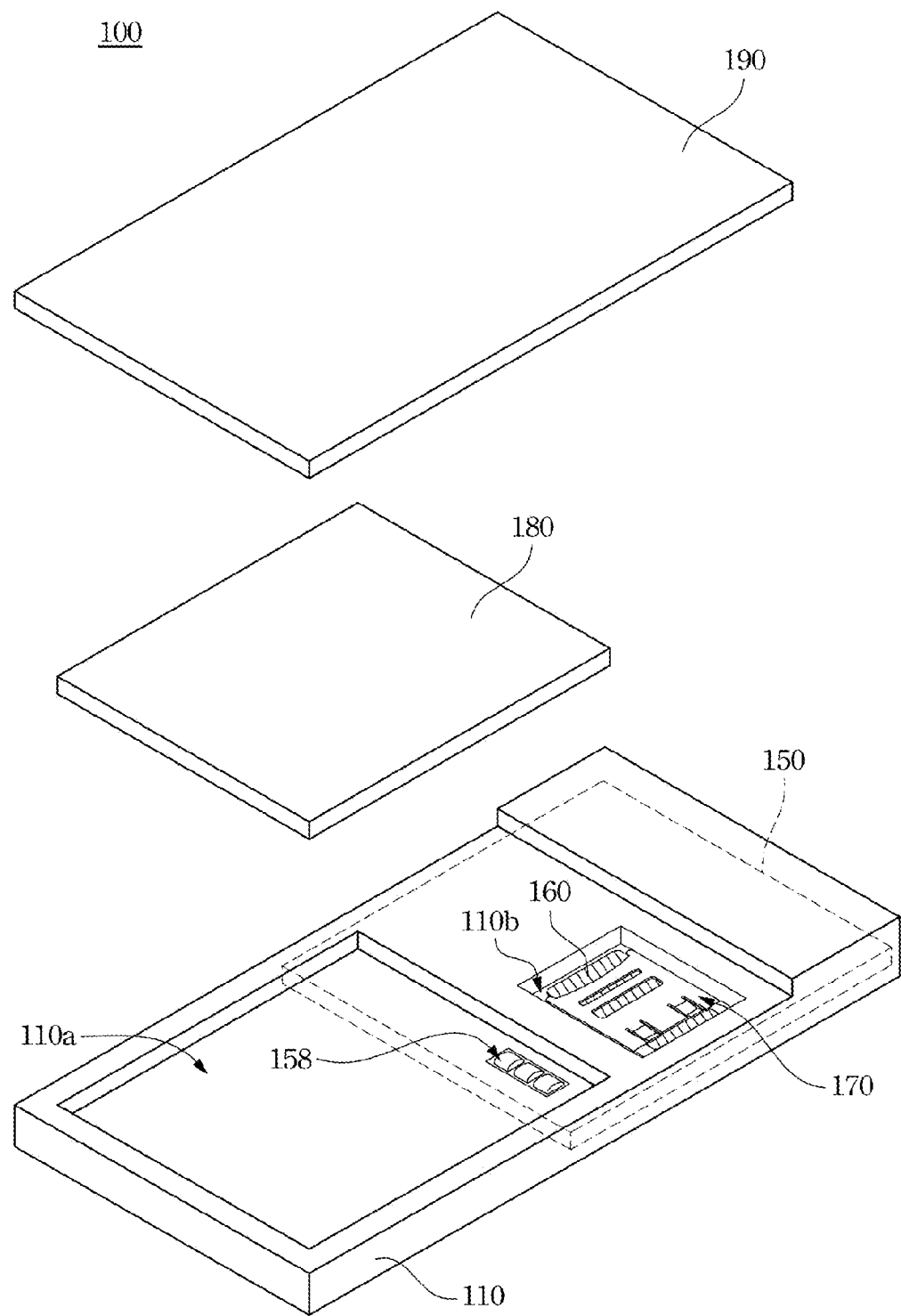
FIG. 1 is a schematic diagram illustrating a portable electronic device according to an embodiment of the present invention.

Referring to FIG. 1, a schematic diagram illustrating a portable electronic device according to an embodiment of the present invention is shown. The portable electronic device 100 comprises a casing 110, a main board 150 and a fastening mechanism 170. The main board 150 is disposed within the casing 110. The casing has a battery slot 110a and a memory card slot 110b. The battery slot 110a is arranged for accommodating a battery 180. The fastening mechanism 170 is disposed on the main board 150 for fastening a memory card 160. The fastening mechanism 170 is disposed in the memory card slot 160 of the casing 110. Because the memory card slot 110b is disposed next to the battery slot 110a, users can take out the memory card 160 from the fastening mechanism 170 without removing the battery 180.

In one embodiment, the main board 150 may comprise a plurality of battery pins 158 disposed to expose themselves on the bottom side of the battery slot 110a. When the battery 180 is accommodated in the battery slot 110a, the plurality of battery pins 158 are in contact with the plurality of corresponding pins of the battery 180, such that the battery 180 is electrically connected to the main board 150, thereby supplying the portable electronic device 100 with the power of the battery 180. Additionally, the portable electronic device 100 further comprises a cover 190. The cover 190 is disposed on the casing 110 for sheltering the components such as the battery 180 and the memory card 160. When the cover 190 is disposed on the casing 110, the cover 190 and the casing 110 are formed into the flattening appearance so as to enhance the aesthetics of the portable electronic device 100.

Figure 2A:
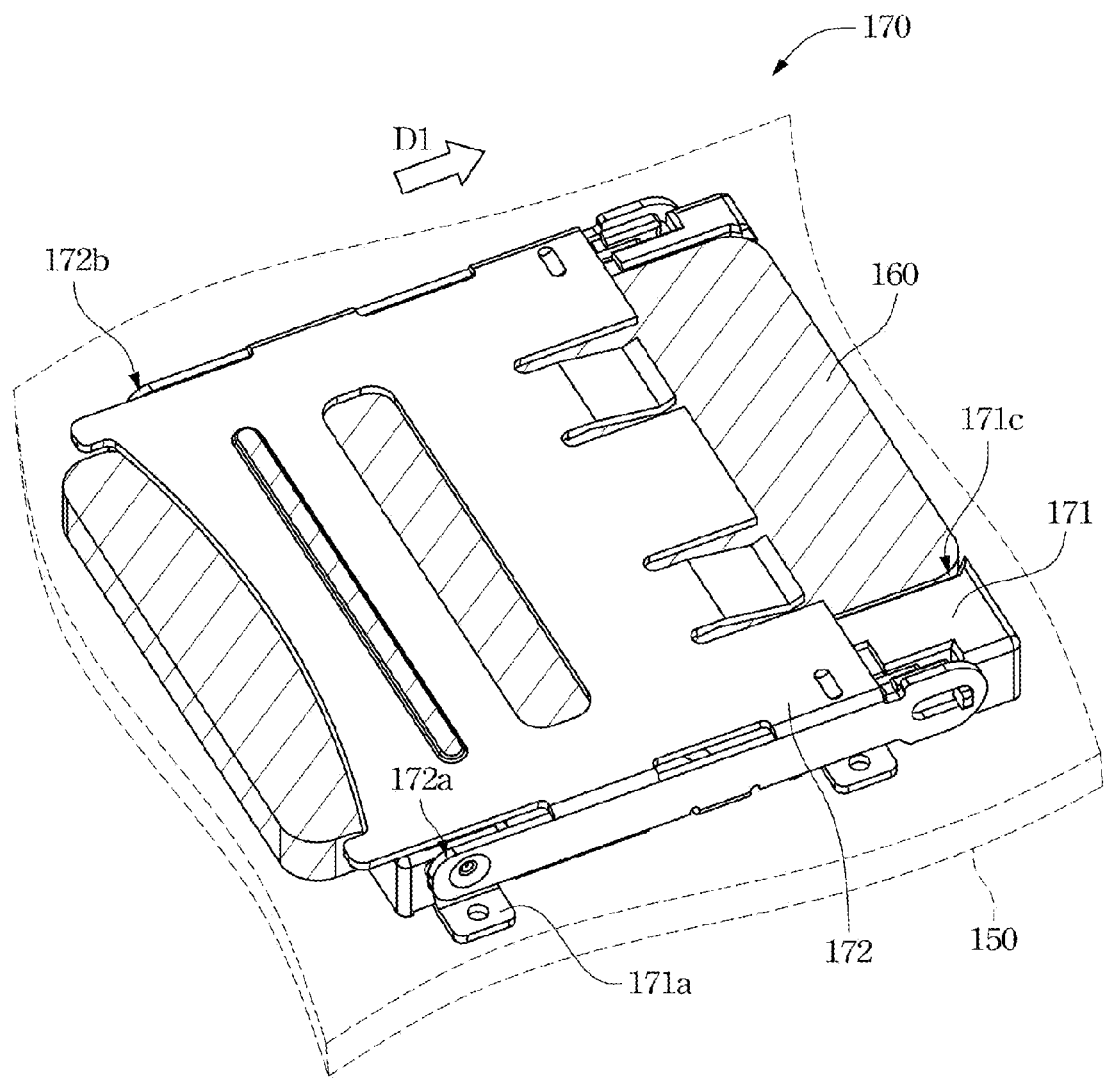
FIG. 2A is a schematic diagram illustrating a fastening mechanism according to an embodiment of the present invention.
Figure 2B:
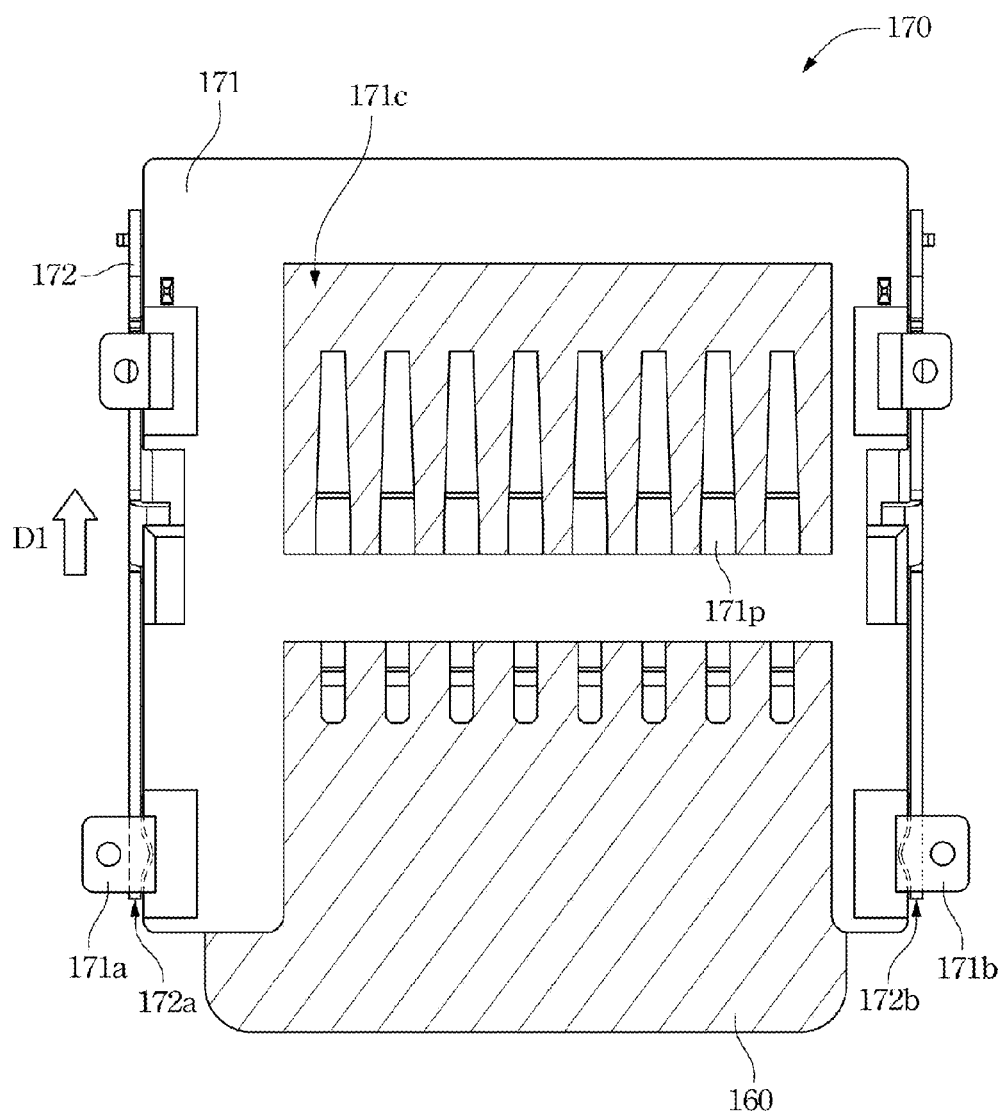
FIG. 2B is a schematic diagram of another angle of view illustrating the fastening mechanism of FIG. 2A.

A fastening mechanism 170 according to an embodiment of the present invention is described as follows. Referring to FIGS. 2A and 2B, FIG. 2A shows a schematic diagram illustrating a fastening mechanism according to an embodiment of the present invention, and FIG. 2B is a schematic diagram of another angle of view illustrating the fastening mechanism of the FIG. 2A. The fastening mechanism 170 is arranged for fastening a memory card 160, and comprises at least a base 171. The fastening mechanism 170 is disposed on the main board 150 via the base 171. The base 171 has an accommodating slot 171c, and comprises a first fastener 171a and a second fastener 171b. The accommodating slot 171c is used for accommodating the memory card 160. The first fastener 171a is electrically connected to the battery 180 (as shown in FIG. 1) through the main board 150, and the second fastener 171b is electrically connected to the memory card 160. The first fastener 171a and the second fastener 171b are disposed on two sides of the base 171 corresponding to the accommodating slot 171c, respectively.

As shown in FIG. 2B, the base 171 of the present embodiment further has a plurality of resilient pins 171p which are disposed in the accommodating slot 171c. When the memory card 160 is accommodated in the accommodating slot 171c, the plurality of resilient pins 171p are electrically connected to the memory card 160. The plurality of resilient pins 171p are further electrically connected to the second fastener 171b, thereby electrically connecting the memory card 160 to the second fastener 171b. Furthermore, the plurality of resilient pins 171p may be electrically connected with the main board 150 to transfer data to the memory card 160 from the main board 150, or transfer to the main board 150 from the memory card 160.

On the other hand, as shown in FIG. 2A, the fastening mechanism 170 further comprises a metal frame 172 which is fit to be connected to the base 171. In an embodiment, the metal frame 172 is connected to the base 171 by a pivot joint. More specifically, the metal frame 172 is connected to the base 171 by being movable between a fastening position and a disengaging position in which the metal frame is not fastened to the first fastener and the second fastener. At status illustrating FIG. 2A and FIG. 2B, the metal frame 172 is disposed in the fastening position on the base 171. When the metal frame 172 is fastened to the first fastener 171a and the second fastener 171b, the metal frame 172 is disposed in the fastening position. In the meanwhile, the metal frame 172 leans against the memory card 160 to dispose the memory card 160 between the base 171 and the metal frame 172. At the same time, an electrical path is formed among the first fastener 171a, the second fastener 171b and the metal frame 172.

Figure 2C:
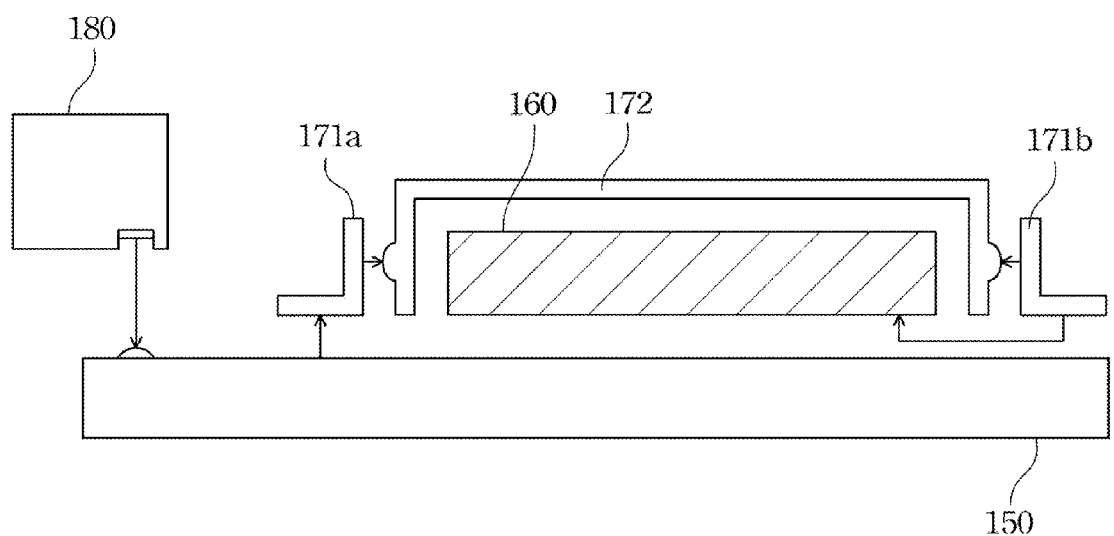
FIG. 2C is a schematic diagram illustrating the power supply system of the fastening mechanism of FIG. 2A.

Referring to FIG. 2C, it is a schematic diagram illustrating the power supply system of the fastening mechanism in FIG. 2A. The electrical path is formed among the first fastener 171a, the metal frame 172 and the second fastener 171b, such that the memory card 160 is supplied with the power of the battery 180 through the main board 150, the first fastener 171a, the metal frame 172 and the second fastener 171b. In another embodiment, the battery 180 supplies the power to the casing 110 through the electrical path formed by the first fastener 171a, the metal frame 172 and the second fastener 171b. In other words, the power of the portable electronic device 100 can be turned on, when the metal frame 172 is disposed in the fastening position.

As shown in FIG. 2B, in an embodiment, the metal frame 172 further comprises a third fastener 172a and a fourth fastener 172b arranged for respectively fastening the first fastener 171a and the second fastener 171b. In this way, the metal frame 172 is fastened in the fastening position to stably and electrically connect the third fastener 172a to the first fastener 171a, and to stably and electrically connect the fourth fastener 172b to the second fastener 171b.

Moreover, the metal frame 172 may selectively comprise a metal wire which is electroplated on the surface of the metal frame 172 to electrically connect to the third fastener 172a and the fourth fastener 172b. The metal of the metal wire, such as gold, copper or other metals, has an intrinsic resistance which is less than or equal to 0.1 ohm. When the metal frame 172 is fastened to the first fastener 171a and the second fastener 171b, the metal frame 172 is effective to electrically connect the first fastener 171a to the second fastener 171b by the metal wire.

Figure 3A:
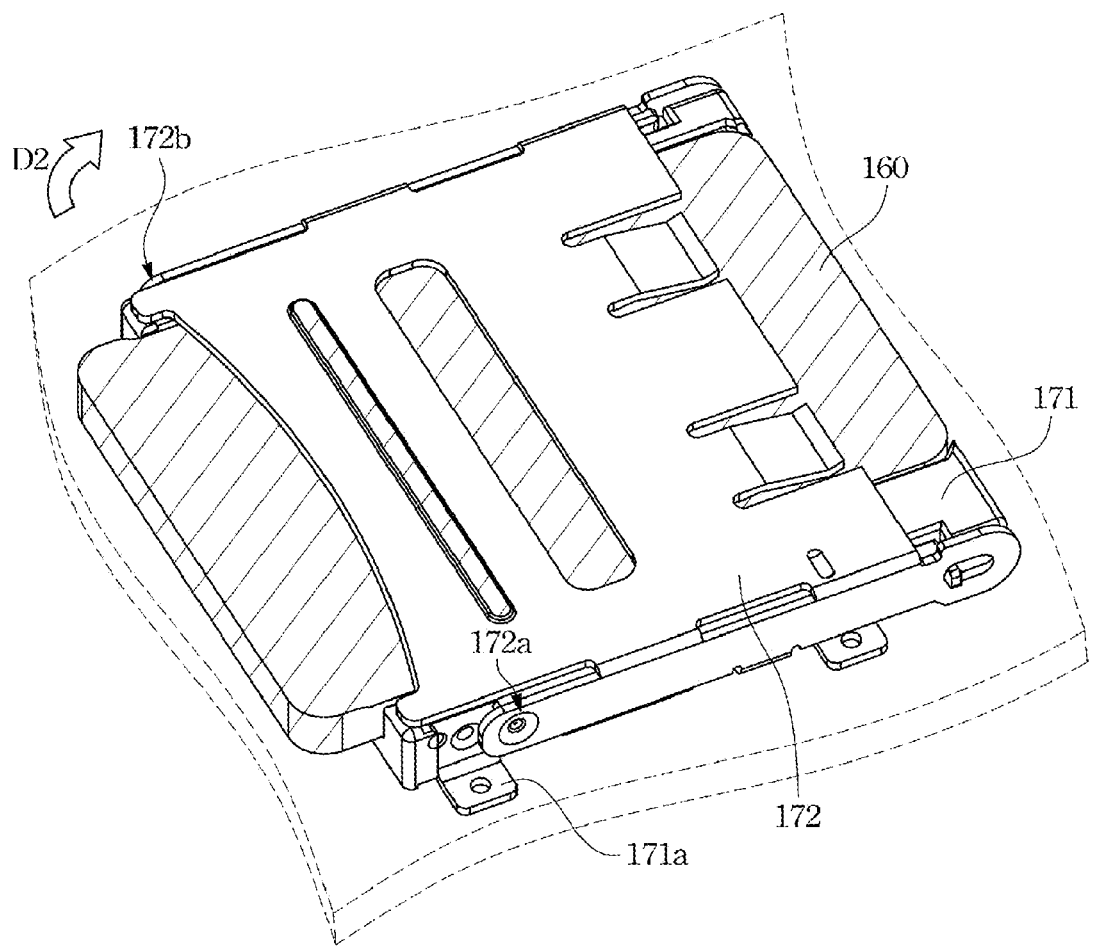
FIG. 3A is a schematic diagram illustrating the metal frame in the disengaging position.

When it is necessary to remove the memory card 160, the metal frame 172 is moved along a first direction D1, such that the memory card 160 is disengaged from the fastening position. Referring to FIG. 3A, it is a schematic diagram illustrating the metal frame in the disengaging position. When the metal frame 172 is moved to the disengaging position from the fastening position, the third fastener 172a is disengaged from the first fastener 171a, and the fourth fastener 172b is disengaged from the second fastener 171b. In the meanwhile, the electrical path formed among the first fastener 171a, the second fastener 171b and the metal frame 172 is opened, thereby disconnecting the memory card 160 from the power of the battery 180.

Figure 3B:
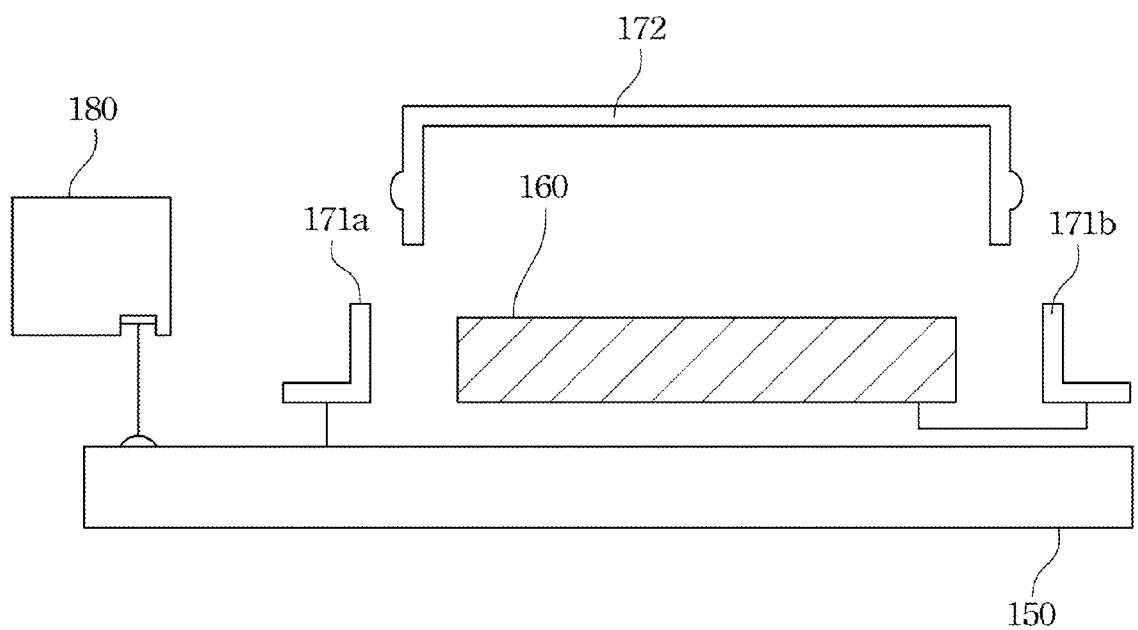
FIG. 3B is a schematic diagram illustrating the power supply system of the metal frame of FIG. 3A.

Referring to FIG. 3B, it is a schematic diagram illustrating the power supply system of the metal frame of FIG. 3A. The electrical path formed among the first fastener 171a, the second fastener 171b and the metal frame 172 is opened to prevent supplying the memory card 160 with the power of the battery 180. In another embodiment, while the metal frame 172 is disposed in the disengaging position, the casing 110 is disconnected from the power of the battery 180, such that the overall portable electronic device 100 is at the open circuit state.

Figure 4:
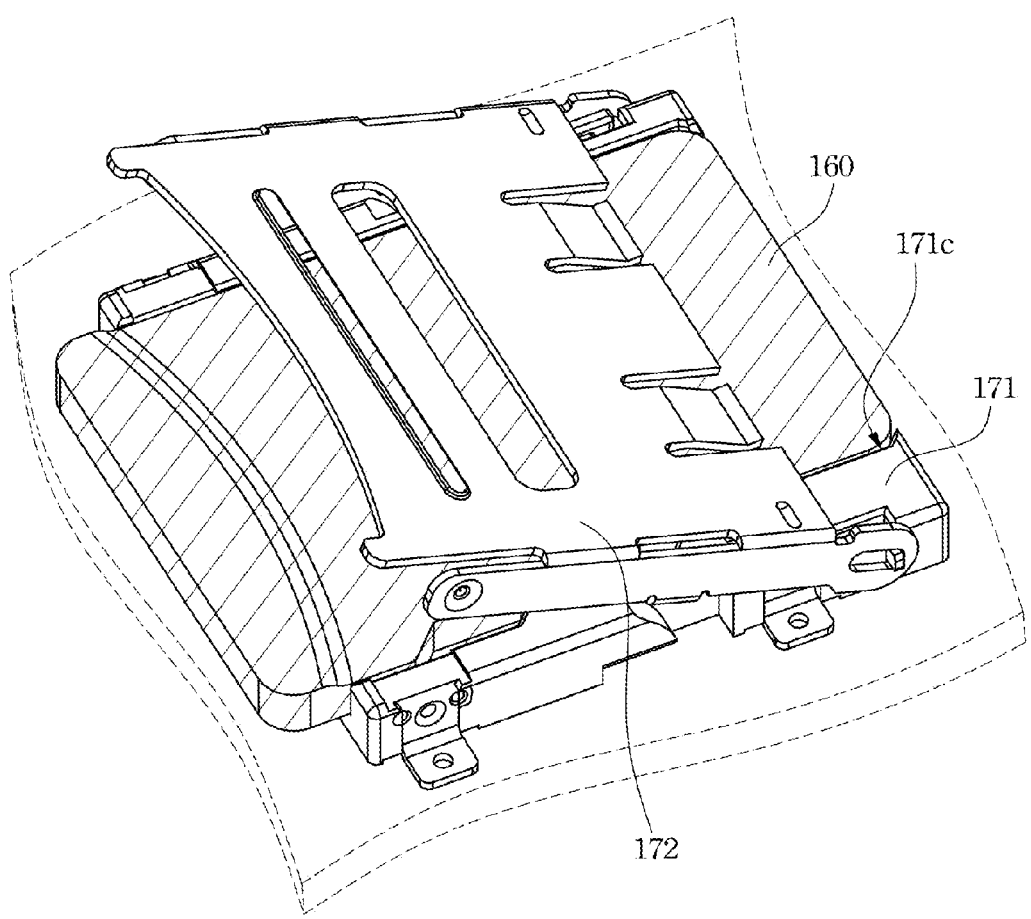
FIG. 4 is a schematic diagram after lifting the memory card and the metal frame.

On the other hand, when the metal frame 172 is disposed in the disengaging position, the memory card 160 and the metal frame 172 are lifted by the plurality of resilient pins 171p (as shown in FIG. 2B), thereby the memory card 160 and the metal frame 172 are sprung along a second direction D2 from the base 171. Referring to FIG. 4, a schematic diagram after lifting the memory card and the metal frame is shown. The memory card 160 is sprung out of the accommodating slot 171c by way of pushing the plurality of resilient pins 171p against the memory card 160. Meanwhile, users can easily take out the memory card 160.

The metal frame 172 and the memory card 160 of the present invention are not synchronously lifted corresponding to the base 171. However, in another embodiment, the metal frame 172 comprises an inserting slot, and the memory card 160 is inserted into the inserting slot, thereby synchronously rotating both the metal frame 172 and the memory card 160 corresponding to the base 171.

In a practical application, the portable electronic device may be, for example, a cellular phone. The memory card 160 may be, for example, a secure digital card (SD card), a micro SD card, a smart media card (SM card), a multi-media card (MMC) or other memory cards suitable for the portable electronic device.

Because the metal frame 172 is moved to the disengaging position from the fastening position, the electrical path formed among the first fastener 171a, the metal frame 172 and the second fastener 171b is opened to prevent supplying the memory card 160 and the portable electronic device 100 with the power of the battery 180. In this way, the memory card 160 is at the open circuit state while removing the memory card 160 by users, so as to prevent the memory card 160 from being damaged.

According to the fastening mechanism and the portable electronic device comprising the fastening mechanism of the embodiments of the present invention as set forth, when the metal frame is moved to the disengaging position from the fastening position, the electrical path formed among the first fastener, the metal frame and the second fastener is opened, thereby disconnecting the memory card and portable electronic device from the power of the battery. In this way, the memory card is at the open circuit state while removing the memory card by users so as to prevent the memory card from being damaged. Moreover, by means of the metal frame of the fastening mechanism as an open circuit mechanism, it is unnecessary to externally dispose a detecting switch to turn off the power thereof, thereby saving costs.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fastening mechanism, comprising:
   a base with an accommodating slot for accommodating a memory card, the base having:
   a first fastener for electrically connecting to a battery; and
   a second fastener for electrically connecting to the memory card, the first fastener and the second fastener being disposed on two opposite sides of the accommodating slot respectively; and
   a metal frame fit to be connected to the base;
   wherein when the memory card is accommodated and connected to the second fastener and the metal frame is fastened to the first fastener and the second fastener, the metal frame is disposed in a fastening position relative to the base and leans against the memory card thereby clamping the memory card between the base and the metal frame, and then an electrical path is formed among the first fastener, the second fastener and the metal frame to supply the memory card with power of the battery connected to the first fastener.

2. The fastening mechanism as claimed in claim 1, wherein the metal frame is connected to the base by being movable between the fastening position and a disengaging position in which the metal frame is not fastened to the first fastener and the second fastener.

3. The fastening mechanism as claimed in claim 2, wherein when the metal frame is disposed in the disengaging position, the electrical path formed among the first fastener, the second fastener and the metal frame is opened to prevent supplying the memory card with the power of the battery.

4. The fastening mechanism as claimed in claim 2, wherein the base has a plurality of resilient pins; and when the metal frame is disposed in the fastening position, the metal frame is electrically connected to the memory card, and the plurality of resilient pins are disposed in the accommodating slot and electrically connected to the second fastener.

5. The fastening mechanism as claimed in claim 4, wherein when the metal frame is disposed in the disengaging position, the memory card and the metal frame are lifted by the plurality of resilient pins.

6. The fastening mechanism as claimed in claim 1, wherein the metal frame further comprises a third fastener and a fourth fastener arranged for fastening the first fastener and the second fastener respectively.

7. The fastening mechanism as claimed in claim 6, wherein the metal frame further comprises a metal wire electrically connected with the third fastener and the fourth fastener, and the metal wire has an intrinsic resistance less than or equal to 0.1 ohm.

8. The fastening mechanism as claimed in claim 1, wherein the metal frame is connected to the base by a pivot joint.

9. A portable electronic device, comprising:
a main board for electrically connecting to a battery; and
a fastening mechanism arranged for fastening a memory card, comprising:
  a base with an accommodating slot for accommodating the memory card, the base being disposed on the main board and having:
    a first fastener for electrically connecting to the battery through the main board; and
    a second fastener for electrically connecting to the memory card, the first fastener and the second fastener being disposed on two opposite sides of the accommodating slot respectively; and
  a metal frame fit to be connected to the base;
wherein when the memory card is accommodated and connected to the second fastener and the metal frame is fastened to the first fastener and the second fastener, the metal frame is disposed in a fastening position relative to the base and leans against the memory card thereby clamping the memory card between the base and the metal frame, and then an electrical path is formed among the first fastener, the second fastener and the metal frame to supply the memory card with power of the battery connected to the first fastener.

10. The portable electronic device as claimed in claim 9, wherein the metal frame is connected to the base by being movable between the fastening position and a disengaging position in which the metal frame is not fastened to the first fastener and the second fastener.

11. The portable electronic device as claimed in claim 10, wherein when the metal frame is disposed in the disengaging position, the electrical path formed among the first fastener, the second fastener and the metal frame is opened to prevent supplying the memory card with the power of the battery.

12. The portable electronic device as claimed in claim 10, wherein the base has a plurality of resilient pins; and when the metal frame is disposed in the fastening position, the metal frame is electrically connected to the memory card, and the plurality of resilient pins are disposed in the accommodating slot and electrically connected to the second fastener.

13. The portable electronic device as claimed in claim 12, wherein when the metal frame is disposed in the disengaging position, the memory card and the metal frame are lifted by the plurality of resilient pins.

14. The portable electronic device as claimed in claim 9, further comprising a casing, wherein the main board is disposed in the casing, the casing has a battery slot and a memory card slot, the memory card slot is disposed next to the battery slot, the battery slot is arranged for accommodating the battery, and the fastening mechanism is disposed in the memory card slot.

15. The portable electronic device as claimed in claim 9, wherein the metal frame is connected to the base by a pivot joint.

* * * * *